(12) United States Patent
Lee

(10) Patent No.: US 12,736,352 B2
(45) Date of Patent: Sep. 15, 2026

(54) APPARATUS AND METHOD FOR ESTIMATING LOCATION OF VEHICLE

(71) Applicant: SK TELECOM CO., LTD., Seoul (KR)

(72) Inventor: Taekyeong Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 199 days.

(21) Appl. No.: 18/513,510

(22) Filed: Nov. 18, 2023

(65) Prior Publication Data

US 2024/0094008 A1 Mar. 21, 2024

Related U.S. Application Data

(60) Division of application No. 17/188,242, filed on Mar. 1, 2021, now Pat. No. 11,898,851, which is a (Continued)

(30) Foreign Application Priority Data

Nov. 9, 2018 (KR) ........................ 10-2018-0137424

(51) Int. Cl.
*G06T 7/00* (2017.01)
*G01C 21/30* (2006.01)
(Continued)

(52) U.S. Cl.
CPC .............. *G01C 21/30* (2013.01); *G06T 7/215* (2017.01); *G06T 7/73* (2017.01); *G06V 10/25* (2022.01);
(Continued)

(58) Field of Classification Search
None
See application file for complete search history.

(56) References Cited

U.S. PATENT DOCUMENTS 5,218,367 A * 6/1993 Sheffer ................. B60R 25/102 340/426.2
10,442,355 B2 * 10/2019 Scholl ....................... B60R 1/27
(Continued)

FOREIGN PATENT DOCUMENTS

CN 105574542 A 5/2016
CN 108693541 A 10/2018
(Continued)

OTHER PUBLICATIONS

Office Action in Chinese Application No. 201980065118.3 dated Nov. 14, 2023 and English translation.
(Continued)

*Primary Examiner* — James M McPherson
(74) *Attorney, Agent, or Firm* — WTA IP Law P.C.

(57) ABSTRACT

In accordance with an aspect of the present disclosure, there is provided an apparatus for estimating a location of a vehicle including, a communication unit configured to receive, from an information providing vehicle, identification information and location information on a driving vehicle in a vicinity of the information providing vehicle, a weighted value obtaining unit configured to obtain a weighted value representing accuracy of the location information based on the received identification information and a location estimating unit configured to estimate a location of the driving vehicle by applying the weighted value to the location information.

13 Claims, 9 Drawing Sheets

Related U.S. Application Data continuation-in-part of application No. PCT/KR2019/015283, filed on Nov. 11, 2019.

(51) Int. Cl.

| | |
|---|---|
| ***G06T 7/215*** | (2017.01) |
| ***G06T 7/73*** | (2017.01) |
| ***G06V 10/25*** | (2022.01) |
| ***G06V 20/56*** | (2022.01) |
| ***G06V 20/58*** | (2022.01) |
| ***G08G 1/00*** | (2006.01) |
| ***G08G 1/017*** | (2006.01) |
| ***G08G 1/16*** | (2006.01) |
| *G06V 20/62* | (2022.01) |

(52) U.S. Cl.

CPC .............. *G06V 20/56* (2022.01); *G06V 20/58* (2022.01); *G08G 1/0175* (2013.01); *G08G 1/161* (2013.01); *G08G 1/20* (2013.01); *G06T 2207/30261* (2013.01); *G06V 20/625* (2022.01)

(56) References Cited

U.S. PATENT DOCUMENTS

| | | | | |
|---|---|---|---|---|
| 2009/0140887 | A1 | 6/2009 | Breed | |
| 2013/0278441 | A1 | 10/2013 | Rubin | |
| 2014/0039987 | A1* | 2/2014 | Nerayoff | H04N 7/181 348/148 |
| 2014/0257943 | A1* | 9/2014 | Nerayoff | G08G 1/144 382/104 |
| 2016/0034771 | A1 | 2/2016 | Schamp | |
| 2016/0039436 | A1* | 2/2016 | Bhagwatkar | H04N 7/185 348/148 |
| 2016/0078759 | A1* | 3/2016 | Nerayoff | G06Q 20/145 701/3 |
| 2016/0293003 | A1* | 10/2016 | Ng | G08G 1/0141 |
| 2018/0165960 | A1 | 6/2018 | Seo et al. | |
| 2018/0260613 | A1 | 9/2018 | Gao | |
| 2018/0281680 | A1 | 10/2018 | Gerardo Castro et al. | |
| 2019/0050634 | A1* | 2/2019 | Nerayoff | G07B 15/02 |
| 2019/0146508 | A1 | 5/2019 | Dean | |
| 2020/0200855 | A1* | 6/2020 | Newman | G07C 5/0841 |
| 2021/0094577 | A1 | 4/2021 | Shalev-Shwartz | |
| 2021/0291859 | A1 | 9/2021 | Kido | |
| 2023/0135207 | A1 | 5/2023 | Schuh | |

FOREIGN PATENT DOCUMENTS

| | | | |
|---|---|---|---|
| EP | 2 562 681 | A1 | 2/2013 |
| KR | 10-2015-0053073 | A | 5/2015 |
| KR | 10-1690050 | B1 | 12/2016 |
| KR | 10-2018-0031146 | A | 3/2018 |
| KR | 10-1848019 | B1 | 4/2018 |
| KR | 10-2018-0069501 | A | 6/2018 |
| KR | 10-2018-0114729 | A | 10/2018 |

OTHER PUBLICATIONS

PCT International Search Report and Written Opinion, PCT Application No. PCT/KR2019/015283, Feb. 24, 2020, 15 pages.

Office Action in Korean Application No. 10-2018-0137424 dated May 24, 2023 and English translation.

* cited by examiner

Figure 1:
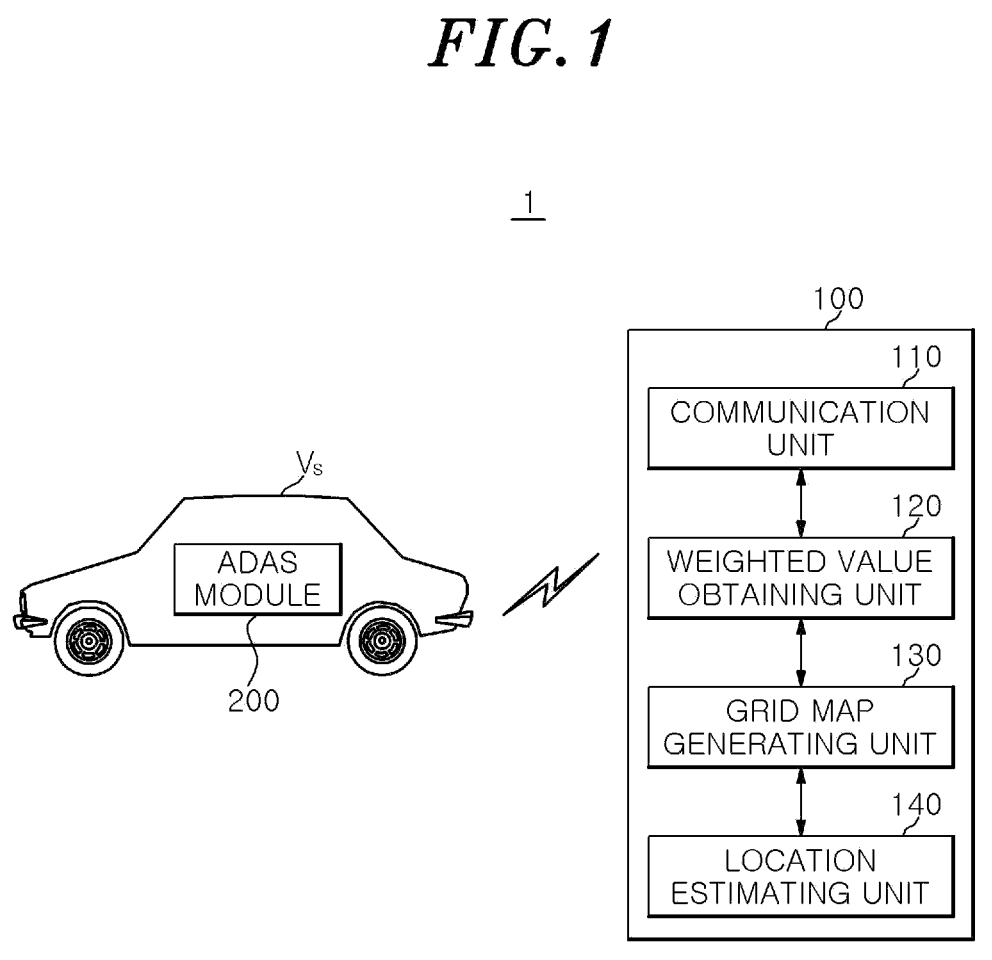

COMMUNICATION UNIT

120

WEIGHTED VALUE OBTAINING UNIT

130

GRID MAP GENERATING UNIT

140

LOCATION ESTIMATING UNIT $V_S$

ADAS MODULE

200

APPARATUS AND METHOD FOR ESTIMATING LOCATION OF VEHICLE

CROSS-REFERENCE TO RELATED APPLICATIONS

This application is a divisional of U.S. patent application Ser. No. 17/188,242, filed on Mar. 1, 2021, which is a bypass continuation application of International PCT Application No. PCT/KR2019/015283, filed on Nov. 11, 2019, which claims priority to Republic of Korea Patent Application No. 10-2018-0137424, filed on Nov. 9, 2018, which are incorporated by reference herein in their entirety.

TECHNICAL FIELD

The present disclosure relates to a vehicle location estimating apparatus and method for estimating a location of a driving vehicle from an image obtained by a camera of a vehicle.

BACKGROUND

In general, a vehicle represents a transportation machine running on roads or tracks using fossil fuel, electricity, or the like as a power source.

The vehicle is steadily evolving to provide various functions to a driver according to development of technology. Particularly, according to the trend of vehicle electrification, a vehicle with an Active Safety System (ASS) that is operated to prevent an accident immediately before or at the time of the occurrence of the accident.

Further, in recent years, in order to alleviate burdens on the driver and to enhance convenience, researches on a vehicle with an Advanced Driver Assistance System (ADAS) that actively provides information on a driving environment, such as vehicle condition, a driver's condition, and a surrounding environment are conducted.

Since the ADAS operates according to the driving environment including a factor determined in relation to a surrounding vehicle, a location of the surrounding vehicle is needed to be estimated prior to the operation. In this case, when the location of the surrounding vehicle estimated by the ADAS mounted on each of the plurality of the vehicles is collected, it may be possible to monitor a plurality of driving vehicles running on the road.

SUMMARY

The problem to be solved by the present disclosure is to provide a vehicle location estimating apparatus and method for estimating a location of a driving vehicle by applying a weighted value obtained based on identification information of the driving vehicle in a surrounding image to location information of the driving vehicle.

However, the problem to be solved by the present disclosure is not limited to above description, and another problem to be solved that is not described above may be clearly understood from the following description by those skilled in the art to which the present disclosure belongs.

In accordance with an aspect of the present disclosure, there is provided an apparatus for estimating a location of a vehicle including, a communication unit configured to receive, from an information providing vehicle, identification information and location information on a driving vehicle in a vicinity of the information providing vehicle, a weighted value obtaining unit configured to obtain a weighted value representing accuracy of the location information based on the received identification information and a location estimating unit configured to estimate a location of the driving vehicle by applying the weighted value to the location information.

In accordance with an aspect of the present disclosure, there is provided a method of estimating a location of a vehicle including, obtaining, from surrounding images obtained by an information providing vehicle at a plurality of points of time, relative location information of a driving vehicle based on a coordinate system for the information providing vehicle, obtaining absolute location information of the driving vehicle based on absolute location information of the information providing vehicle according to an absolute coordinate system, extracting property information for the driving vehicle from the surrounding image, obtaining identification information for the driving vehicle including probability information on a probability for each property information that the driving vehicle has said each property information, the probability information being calculated by counting a number that the property information is extracted from the surrounding images and transmitting the absolute location information of the driving vehicle and the identification information to a vehicle location estimating apparatus.

The vehicle location estimating apparatus and method according to an embodiment of the present disclosure may increase accuracy of location estimation for the driving vehicle because an information providing vehicle obtains probability information for property information by accumulating the property information of the driving vehicle and the vehicle location estimating apparatus applies the weighted value determined based on the probability information for the property information to the location information of the driving vehicle.

Specifically, if the property information for a license plate is estimated from a surrounding image obtained by a camera having a low resolution, accuracy of identifying the driving vehicle may be lowered. On the other hand, the vehicle location estimating apparatus and method according to an embodiment of the present disclosure probabilistically considers the property information for properties other than the license plate, thereby reducing a possibility of misrecognition according to the low resolution.

BRIEF DESCRIPTION OF THE DRAWINGS

FIG. 1 shows a functional block diagram of a vehicle location estimating system according to an embodiment of the present disclosure.

DETAILED DESCRIPTION

Figure 2:
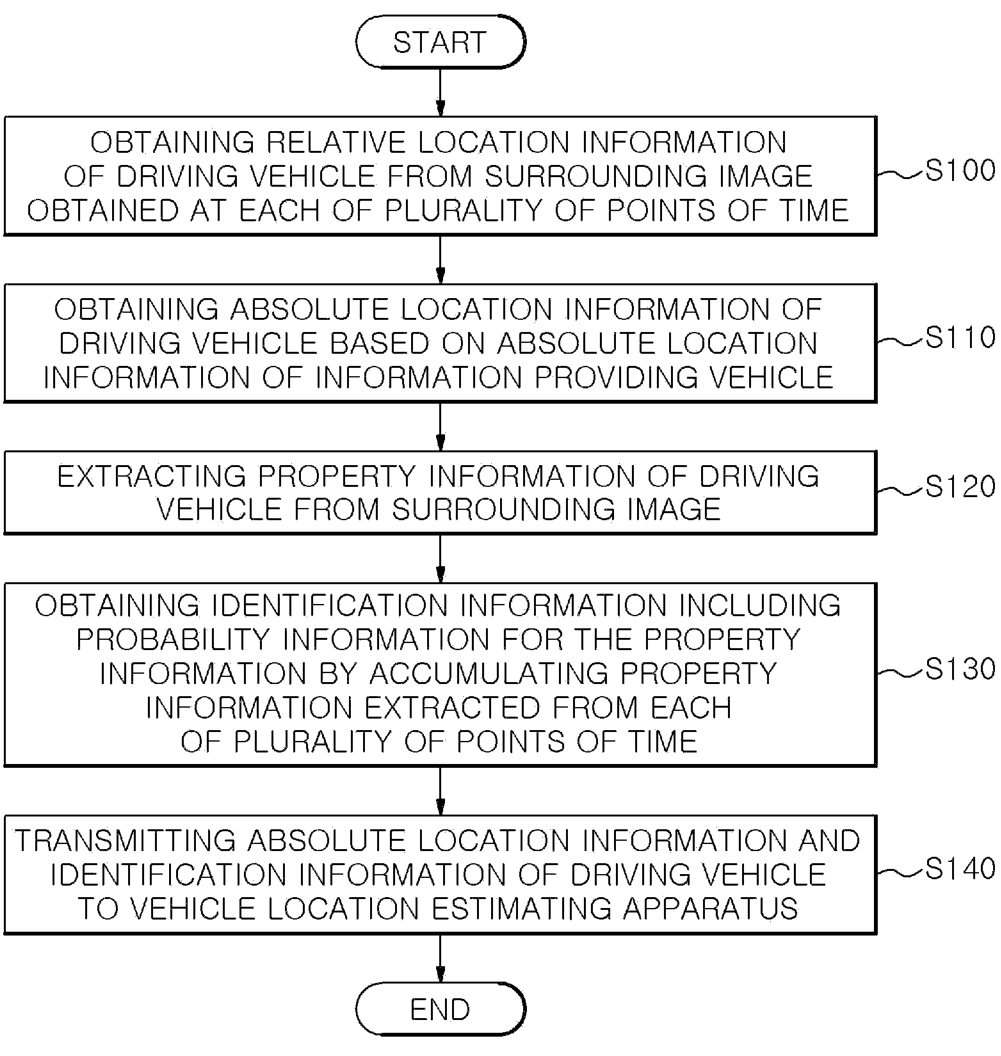
FIG. 2 shows a flowchart illustrating a vehicle location estimating method performed by an information providing vehicle according to an embodiment of the present disclosure.

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

FIG. 1 shows a functional block diagram of a vehicle location estimating system 1 according to an embodiment of the present disclosure.

The vehicle location estimating system 1 of the present disclosure indicates to any system capable of monitoring a vehicle running on a road in real time by using location information and identification information of surrounding vehicles obtained by an information providing vehicle $V_s$ equipped with an ADAS module 200.

Monitoring the vehicle being driven (hereinafter, referred as a driving vehicle) may be not only used to improve a driving environment of the road on which the driving vehicle is running, but also be a basis for obtaining a location and a driving route of a specific vehicle according to a predetermined purpose. For example, a result of the above-described monitoring may be used to track a suspect vehicle for crime prevention purposes.

When estimating a location of a vehicle by using CCTV, accuracy of a result of estimating a location may vary depending on a location where the CCTV is installed. Since it is not easy to change the location of the CCTV after installation, if a vehicle of which a location is to be estimated selects a driving route excluding the location of the CCTV, it may be difficult to estimate the location of the vehicle.

To solve this, a vehicle traveling on the road may be monitored by using a dashcam mounted on the vehicle. As the dashcam moves along with the vehicle's moving, surrounding images may be obtained so that information on driving vehicles in various locations may be obtained. However, in this method, accuracy may be determined according to resolution of a camera in the dashcam. If the resolution of the camera in the dashcam is extremely low, it may be impossible to estimate a location of a vehicle. In addition, even if a location may be estimated, extracting property information such as a license plate of a vehicle from the image captured by the camera has possibility of misrecognition, and thus a result of estimation based on the extremely low resolution also may not guarantee accuracy.

Accordingly, the vehicle location estimating system 1 according to an embodiment of the present disclosure may estimate a location of the driving vehicle by applying a weighted value obtained based on the identification information of the driving vehicle on the surrounding image to the location information of the driving vehicle.

Referring to FIG. 1, the vehicle location estimating system 1 according to an embodiment of the present disclosure may include the information providing vehicle $V_s$ on which the ADAS module 200 is mounted; and a vehicle location estimating apparatus 100 for estimating the location of the driving vehicle.

The vehicle location estimating system 1 may be provided to enable wireless communication between the information providing vehicle $V_s$ and the vehicle location estimating apparatus 100. Specifically, the vehicle location estimating system 1 may provide an environment in which information may be exchanged between the information providing vehicle $V_s$ and the vehicle location estimating apparatus 100 by employing various publicly known communication methods. The vehicle location estimating system 1 according to an embodiment may provide a communication environment through a base station by adopting a publicly known communication method such as CDMA, GSM, W-CDMA, TD-SCDMA, WiBro, LTE, EPC, and the like. Alternatively, the vehicle location estimating system 1 according to another embodiment may provide a communication environment in which communication between the information providing vehicle $V_s$ and the vehicle location estimating apparatus 100 is performed with each other within a predetermined distance according to a communication method such as a wireless LAN, Wi-Fi, Bluetooth, Zigbee, Wi-Fi Direct (WFD), Ultra-Wide Band (UWB), Infrared Data Association (IrDA), Bluetooth Low Energy (BLE), Near Field Communication (NFC), and the like. However, the method in which a communication unit 110 communicates with the information providing vehicle $V_s$ is not limited to the embodiments described above.

The information providing vehicle $V_s$ may obtain the identification information and the location information on the driving vehicle in the vicinity of the information providing vehicle $V_s$. To this end, the information providing vehicle $V_s$ may include the ADAS module 200.

The ADAS module 200 may indicate a means capable of providing driving information to a driver in response to various surrounding environments, or actively controlling a vehicle. For example, the ADAS module 200 according to an embodiment may include a Lane Departure Warning System (LDWS) module, a Lane Keeping Assist System (LKAS) module, an Auto Emergency Braking (AEB) module, an Adaptive Cruise Control (ACC) module, and a Blind Spot Information System (BLIS) module, and/or a Forward Collision Warning (FCW) module, etc.

Such the ADAS module 200 may include a sensing means for sensing the surrounding environment. The sensing means according to an embodiment may include Radar that detects the surrounding environment by emitting a pulse around a vehicle and receiving an echo pulse reflected from an object located in a corresponding direction, LiDAR that emits a laser around the vehicle and receives an echo laser reflected from an object located in a corresponding direction, and/or an ultrasonic sensor that emits an ultrasonic wave around the vehicle and receives an echo ultrasonic wave reflected from an object located in a corresponding direction, and the like.

Further, the ADAS module 200 may include a camera as the sensing means. The camera may be provided to face forward, sideways, and/or rearward from the vehicle, thereby capturing the surrounding image in a corresponding direction. The captured surrounding image may be a basis for obtaining information of the driving vehicle running around the information providing vehicle $V_s$ through an image processing process.

Furthermore, the ADAS module 200 may include a Global Position System (GPS) module as the sensing means. The GPS module may receive a satellite signal including navigation data from at least one GPS satellite. The information providing vehicle $V_s$ may obtain coordinates of a GPS-based current location of the information providing vehicle $V_s$ based on the satellite signal.

In addition, the information providing vehicle $V_s$ may further include a storage means for storing a program including an instruction for performing the vehicle location estimating method according to an embodiment of the present disclosure. The storage means according to an embodiment may include a memory of a flash memory type, a hard disk type, a multimedia card micro type, or a card type (for example, SD or XD memory, etc.), a Random-Access Memory (RAM), a Static Random-Access Memory (SRAM), a Read-Only Memory (ROM), an Electrically Erasable Programmable Read-Only Memory (EEPROM), a Programmable Read-Only Memory (PROM), a magnetic memory, a magnetic disk, and/or an optical disk, etc.

Moreover, the information providing vehicle $V_s$ may further include a communication unit 110 capable of communicating with the vehicle location estimating apparatus 100 according to the communication method adopted by the vehicle location estimating system 1. Through the communication unit 110, the information providing vehicle $V_s$ may provide the identification information and the location information of the driving vehicle to the vehicle location estimating apparatus 100.

The vehicle location estimating apparatus 100 may estimate the location of the driving vehicle based on the identification information and the location information of the driving vehicle received from the information providing vehicle $V_s$. To this end, the vehicle location estimating apparatus 100 according to an embodiment may be configured with a server or a set of a plurality of servers.

The communication unit 110 may receive the identification information and the location information of the driving vehicle from the information providing vehicle $V_s$. To this end, the communication unit 110 may be provided to perform communication according to the communication method adopted by the vehicle location estimating system 1.

The weighted value obtaining unit 120 may obtain the weighted value for the location information based on the received identification information of the driving vehicle. Specifically, the weighted value obtaining unit 120 may group, based on first identification information for the license plate among the received identification information, second identification information for other than the license plate, and may accumulate the grouped second identification information to obtain the weighted value for the location information. Herein, the weighted value for the location information may indicate accumulated accuracy of the location information. In other words, the weighted value for the location information may indicate an accumulated probability that the driving vehicle is located at a location indicated by the location information.

A grid map generating unit 130 may generate a probabilistic grid map of the driving vehicle at each of a plurality of points of time by applying the weighted value to the location information. Herein, the probabilistic grid map may indicate a map in which probability information that the driving vehicle is located on each of a plurality of grids at a specific point of time is accumulated. The grid map generating unit 130 may apply the weighted value to probability information among the received location information corresponding to the point of time, and may accumulate the probability information to which the weighted value is applied to a grid corresponding to location coordinates among the received location information.

The location estimating unit 140 may determine the driving route of the driving vehicle by using the probabilistic grid map and may estimate the location of the driving vehicle based on the determined driving route. Specifically, the location estimating unit 140 may search for candidate driving routes of the driving vehicle based on the probabilistic grid map, determine one of the searched candidate driving routes as the driving route based on a change in a location of the driving vehicle at adjacent points of time on the candidate driving routes and a sum of probabilities that the driving vehicle is located at each point of time, and estimate a location on the driving route at the last point of time as the final location of the driving vehicle.

At least one component of the vehicle location estimating apparatus 100 according to the embodiment illustrated in FIG. 1 may be implemented as a computing device including a Microprocessor. For example, at least one of the weighted value obtaining unit 120, the grid map generating unit 130, and the location estimating unit 140 of the vehicle location estimating apparatus 100 according to an embodiment may be implemented by at least one of various processors such as an Application Processor (AP), a Communication Processor (CP), a Graphic Processing Unit (GPU), and/or a Central Processing Unit (CPU), etc. In addition, it may be possible to implement at least two of each component of the vehicle location estimating apparatus 100 as a System on Chip (SoC).

Heretofore, each component of the vehicle location estimating system 1 has been described. Hereinafter, a vehicle location estimating method performed by each of the information providing vehicle $V_s$ and the vehicle location estimating apparatus 100 of the vehicle location estimating system 1 will be described.

FIG. 2 shows a flowchart illustrating a vehicle location estimating method performed by the information providing vehicle $V_s$ according to an embodiment of the present disclosure.

First, in a step S100, the information providing vehicle $V_s$ may obtain relative location information of a driving vehicle from a surrounding image obtained at each of a plurality of points of time. Herein, the relative location information may indicate location information of the driving vehicle based on a coordinate system for the information providing vehicle $V_s$.

Hereinafter, a method of obtaining the relative location information of the driving vehicle will be described with reference to FIGS. 3 to 4.

Figure 3B:
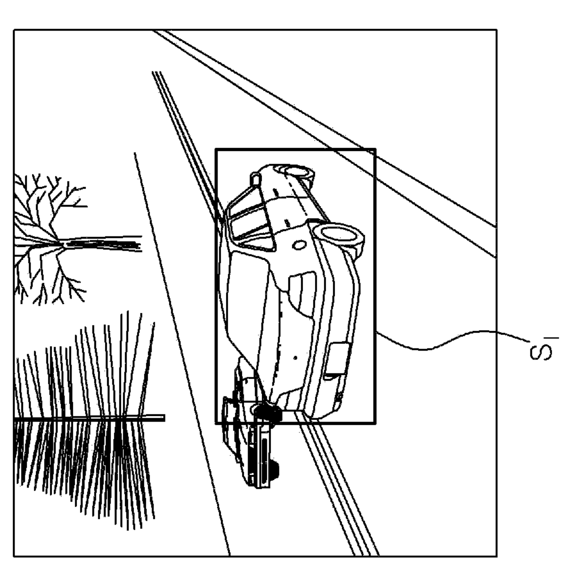
FIGS. 3A and 3B show a diagram illustrating a surrounding image obtained by an information providing vehicle according to an embodiment of the present disclosure.
Figure 3A:
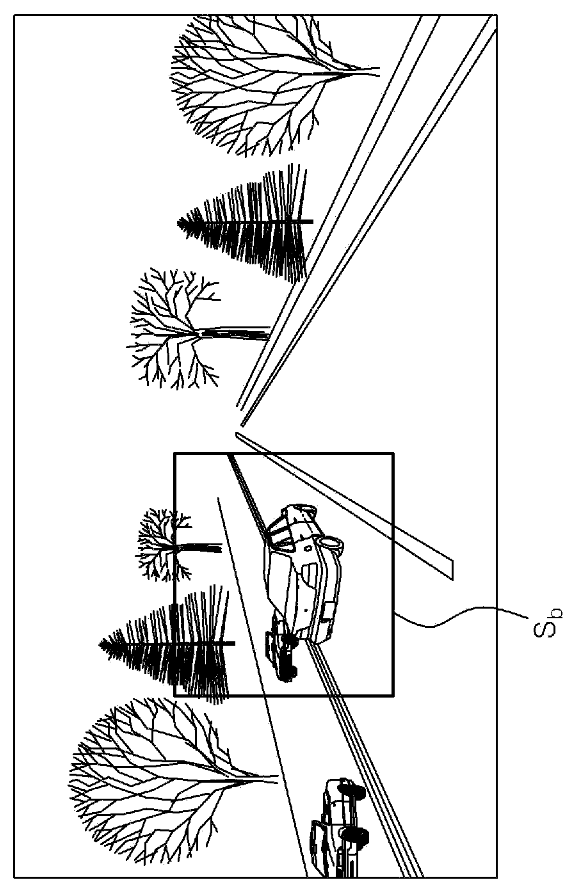
Figure 4:
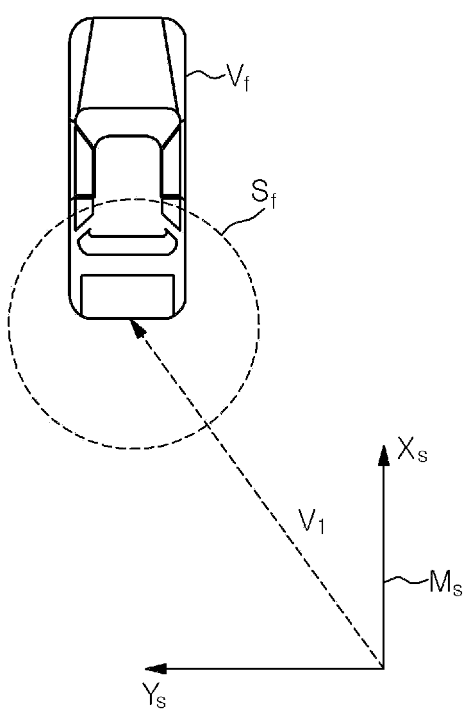
FIG. 4 shows a diagram illustrating a method in which an information providing vehicle obtains relative location information of a driving vehicle according to an embodiment of the present disclosure.

FIGS. 3A and 3B show a diagram illustrating the surrounding image obtained by the information providing vehicle $V_s$ according to an embodiment of the present disclosure and FIG. 4 shows a diagram illustrating a method in which the information providing vehicle $V_s$ obtains the relative location information of the driving vehicle according to an embodiment of the present disclosure.

In order to obtain the relative location information of the driving vehicle, the information providing vehicle $V_s$ may first obtain a surrounding image at each of a plurality of points of time by using a camera. When the surrounding image is obtained, the information providing vehicle $V_s$ may set a region of interest including the driving vehicle on the surrounding image. To this end, the information providing vehicle $V_s$ may set the region of interest by applying at least one of publicly known vehicle identification algorithms to the surrounding image. For example, the information providing vehicle $V_s$ may set the region of interest by using the vehicle identification algorithm obtained according to machine learning such as deep learning. In this case, the region of interest may be in a Bounding Box form.

FIG. 3A illustrates a case where the information providing vehicle $V_s$ obtains an image of an area in front of the information providing vehicle $V_s$ (hereinafter, it will be described as a front view image) as the surrounding image. The information providing vehicle $V_s$ may identify a vehicle in front of the information providing vehicle $V_s$ (hereinafter, it will be described as a front vehicle) on the surrounding image as the driving vehicle and may set the region of interest including the front vehicle.

FIG. 3B illustrates an enlarged view of an area $S_b$ around the front vehicle in FIG. 3A. Referring to FIG. 3B, it may be seen that the information providing vehicle $V_s$ set the region of interest $S_I$ including the front vehicle in the Bounding Box form.

When the region of interest is set, the information providing vehicle $V_s$ may obtain a direction vector to a target point within a boundary of the region of interest $S_I$. Herein, the target point may indicate the location of the driving vehicle located in the region of interest $S_I$. The target point according to an embodiment may indicate a center point of a bottom of the region of interest $S_I$.

The information providing vehicle $V_s$ may obtain the direction vector from a center of a coordinate system for the camera to the target point. By using external parameters of the camera for a position and attitude angle of the camera based on the coordinate system for the information providing vehicle $V_s$, the information providing vehicle $V_s$ may convert the obtained direction vector based on the coordinate system for the information providing vehicle $V_s$.

Assuming that the driving vehicle and the information providing vehicle $V_s$ are running on a single plane, the obtained direction vector may be directed to the rear of the driving vehicle on the ground. Accordingly, the information providing vehicle $V_s$ may obtain the relative location information of the driving vehicle by obtaining a three-dimensional intersection on the plane of the direction vector and the ground.

In addition, the information providing vehicle $V_s$ may estimate a direction of the driving vehicle by using two vertices at a single edge of the region of interest $S_I$. For example, if the driving vehicle is the front vehicle, the information providing vehicle $V_s$ may estimate the direction of the driving vehicle by obtaining three-dimensional locations for both vertices on the bottom of the region of interest $S_I$.

Since there is an error in the relative location information obtained according to above description, the information providing vehicle $V_s$ may obtain Gaussian Distribution through modeling. Specifically, the information providing vehicle $V_s$ may obtain a mean and covariance of the relative location information of the driving vehicle according to Equation 1.

$$\text{Mean pose: } P_{S,F}=\{x_{S,F},y_{S,F},\theta_{S,F}\}, S\text{: self}, F\text{: forward} \quad \text{Covariance: } C_{S,F} \qquad \text{Equation 1}$$

Herein, $P_{S,F}$ may refer to relative location coordinates in the relative location information of the driving vehicle, and $C_{S,F}$ may refer to relative covariance in the relative location information of the driving vehicle.

FIG. 4 illustrates a vector $V_1$ from the origin of a relative coordinate system $M_s$ to a driving vehicle $V_f$ and a region of covariance $S_f$ according to the vector $V_1$. In other words, the relative location information of the driving vehicle $V_f$ according to Equation 1 described above may probabilistically exist at a plurality of locations within the region of covariance $S_f$.

Thereafter, in a step S110, the information providing vehicle $V_s$ may obtain absolute location information of the driving vehicle $V_f$ based on absolute location information of the information providing vehicle $V_s$. Herein, the absolute location information may indicate location information based on an absolute coordinate system.

The information providing vehicle $V_s$ may obtain GPS-based location information as the absolute location information. As described above, since a satellite signal received from a GPS satellite includes three-dimensional location coordinates of an GPS module based on the absolute coordinate system, the information providing vehicle $V_s$ may obtain the absolute location information from the satellite signal.

In addition, in consideration of an error of the satellite signal, the information providing vehicle $V_s$ may also use a detailed map. Herein, the detailed map may indicate a map that has high accuracy for safe and precise control over the vehicle, and include information on an altitude, slope, curvature, and the like as well as a planar location of a road.

The detailed map according to an embodiment may indicate a map where at least lane markings are displayed separately, and may further include road facilities such as traffic signs, traffic lights, and guard rails, and the like.

To this end, the information providing vehicle $V_s$ may extract a feature point from the surrounding image. When the feature point is extracted, the information providing vehicle $V_s$ may obtain more accurate absolute location information by matching a landmark in an area in the detailed map corresponding to the GPS-based location information with the extracted feature point of the surrounding image.

The absolute location information of the information providing vehicle $V_s$ obtained through the above-described method may be expressed according to Equation 2.

$$\text{Mean pose: } P_{W,S}=\{x_{W,S},y_{W,S},\theta_{W,S}\}, W\text{: world}, S\text{: self} \quad \text{Covariance: } C_{W,S} \qquad \text{Equation 2}$$

Herein, $P_{W,S}$ may refer to absolute location coordinates in the absolute location information of the information providing vehicle $V_s$, and $C_{W,S}$ may refer to absolute covariance in the absolute location information of the information providing vehicle $V_s$.

Thereafter, the information providing vehicle $V_s$ may obtain the absolute location information of the driving vehicle $V_f$ based on the absolute location information of the information providing vehicle $V_s$. Hereinafter, a method of obtaining the absolute location information of the driving vehicle $V_f$ will be described with reference to FIG. 5.

Figure 5:
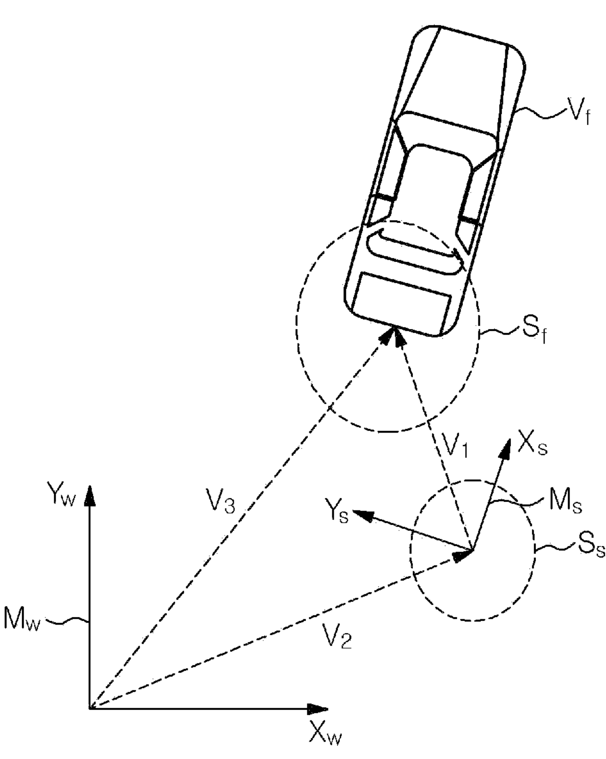
FIG. 5 shows a diagram illustrating a method in which an information providing vehicle obtains absolute location information of a driving vehicle according to an embodiment of the present disclosure.

FIG. 5 shows a diagram illustrating a method in which the information providing vehicle $V_s$ obtains the absolute location information of the driving vehicle $V_f$ according to an embodiment of the present disclosure.

The information providing vehicle $V_s$ may obtain the absolute location information of the driving vehicle $V_f$ based on the absolute location information of the information providing vehicle $V_s$. At this time, since there is an error in the absolute location information of the information providing vehicle $V_s$ and the relative location information of the driving vehicle $V_f$, the information providing vehicle $V_s$ may model the absolute location information of the driving vehicle $V_f$ with the Gaussian Distribution. Specifically, the information providing vehicle $V_s$ may obtain a mean and covariance of the absolute location information of the driving vehicle $V_f$ according to Equation 3.

Equation 3

$$\text{Mean pose: } \begin{bmatrix} x_{W,F} \\ y_{W,F} \\ \theta_{W,F} \end{bmatrix} = R(\theta_{W,S}) \begin{bmatrix} x_{S,F} \\ y_{S,F} \\ \theta_{S,F} \end{bmatrix} + \begin{bmatrix} x_{W,S} \\ y_{W,S} \\ \theta_{W,S} \end{bmatrix}$$

$$\text{Covariance: } C_{W,F} = (J_{W,S} \cdot C_{W,S} \cdot J_{W,S}^T) + (J_{S,F} \cdot C_{S,F} \cdot J_{S,F}^T)$$

$$R(\theta) = \begin{bmatrix} \cos\theta & -\sin\theta & 0 \\ \sin\theta & \cos\theta & 0 \\ 0 & 0 & 1 \end{bmatrix}$$

$$J_{W,S} = \begin{bmatrix} 1 & 0 & -y_{W,F} \\ 0 & 1 & x_{W,F} \\ 0 & 0 & 1 \end{bmatrix}, J_{S,F} = R(\theta_{W,S})$$

Herein, $[x_{W,F}\ y_{W,F}\ \theta_{W,F}]^T$ may refer to absolute location coordinates in the absolute location information of the driving vehicle $V_f$, and $C_{W,F}$ may refer to absolute covariance in the absolute location information of the driving vehicle $V_f$. In addition, $R(\theta)$ may indicate a rotation transformation matrix for converting coordinates from the absolute coordinate system to the relative coordinate system of the vehicle, $J_{W,S}$ may indicate a Jacobian matrix for the absolute location information of the information providing vehicle $V_s$, and $J_{S,F}$ may indicate a Jacobian matrix for the relative location information of the driving vehicle $V_f$.

In FIG. 5, the vector $V_1$ from the origin of the relative coordinate system $M_s$ to the driving vehicle $V_f$ and the corresponding region of covariance $S_f$ are illustrated. Further, FIG. 5 illustrates a vector $V_2$ from the origin of the absolute coordinate system Mw to the origin of the coordinate system for the information providing vehicle $V_s$, a region of covariance $S_s$ according to the vector $V_2$, and a vector $V_3$ from the origin of the absolute coordinate system Mw to the driving vehicle $V_f$. In other words, the absolute location information of the driving vehicle $V_f$ according to Equation 3 described above may probabilistically exist at a plurality of locations within the region of covariance $S_f$.

After obtaining the absolute location information of the driving vehicle, in a step S120, the information providing vehicle $V_s$ may extract property information of the driving vehicle from the surrounding image. Herein, the property information may indicate information that may be extracted from the surrounding image to identify the driving vehicle. The property information according to an embodiment may include first property information for the license plate of the driving vehicle, and second property information for properties, other than the license plate, such as a size, vehicle type, and color of the driving vehicle. Specifically, the information providing vehicle $V_s$ may extract the property information from the region of interest set on the surrounding image at each of a plurality of points of time.

Thereafter, in a step S130, the information providing vehicle $V_s$ may accumulate the property information extracted from each of a plurality of points of time to obtain identification information including probability information for the property information. Hereinafter, a method of obtaining the identification information of the driving vehicle will be described with reference to FIG. 6.

Figure 6:
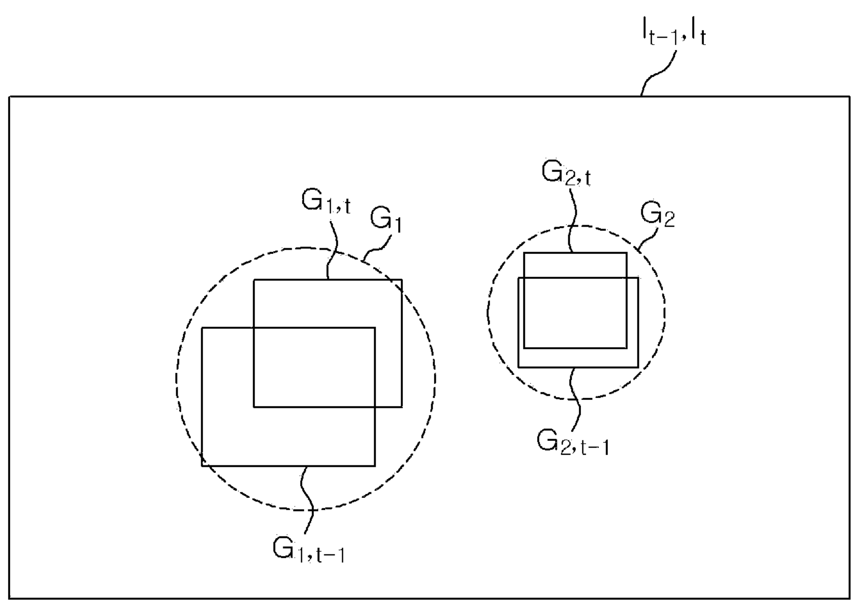
FIG. 6 shows a diagram illustrating a method in which an information providing vehicle obtains identification information of a driving vehicle according to an embodiment of the present disclosure.

FIG. 6 shows a diagram illustrating a method in which the information providing vehicle $V_s$ obtains the identification information of the driving vehicle according to an embodiment of the present disclosure.

In order to obtain the identification information, the information providing vehicle $V_s$ may first group the regions of interest for the single driving vehicle. To this end, the information providing vehicle $V_s$ according to an embodiment may determine, based on an overlap ratio of the regions of interest between surrounding images at adjacent points of time, whether the corresponding region of interest is for the single driving vehicle.

Referring to FIG. 6, when a surrounding image $I_{t-1}$ obtained at a point of time t−1 and a surrounding image $I_t$ obtained at a point of time t are overlapped, it may be seen that a region of interest $G_{1,t-1}$ on the surrounding image $I_{t-1}$ and a region of interest $G_{1,t}$ on the surrounding image $I_t$ have an overlap region. Similarly, it may be seen that a region of interest $G_{2,t-1}$ on the surrounding image $I_{t-1}$ and a region of interest $G_{2,t}$ on the surrounding image $I_t$ have an overlap region. Since the single driving vehicle has a high probability of being located at similar locations on adjacent surrounding images, the information providing vehicle $V_s$ may determine the above regions of interest as regions of interest for the single driving vehicle.

In addition, the information providing vehicle $V_s$ according to another embodiment may compare a size and/or texture of the regions of interest on the surrounding images at the adjacent points of time to determine whether it is for the single driving vehicle. Alternatively, the information providing vehicle $V_s$ may predict a location of the region of interest at a next point of time based on a driving speed of the information providing vehicle $V_s$ to determine whether it is for the single driving vehicle.

If it is determined that the regions of interest on the surrounding images at the adjacent points of time are for the single driving vehicle, the information providing vehicle $V_s$ may group the regions of interest representing the single driving vehicle at the adjacent points of time. For example, referring to FIG. 6, if it is determined that the region of interest $G_{1,t-1}$ and the region of interest $G_{1,t}$ are for the single driving vehicle, the information providing vehicle $V_s$ may tag the region of interest $G_{1,t-1}$ and the region of interest $G_{1,t}$ as a first group $G_1$. If it is determined that the region of interest $G_{2,t-1}$ and the region of interest $G_{2,t}$ are for the single driving vehicle, the region of interest $G_{2,t-1}$ and the region of interest $G_{2,t}$ may be tagged a second group $G_2$.

Thereafter, the information providing vehicle $V_s$ may accumulate the property information extracted from the tagged regions of interest to obtain the identification information including the probability information that the driving vehicle in the tagged regions of interest has the property information. Herein, the property information may indicate information that may be extracted from surrounding images to identify the driving vehicle. The property information according to an embodiment may include information on the license plate, the size, the vehicle type, and the color of the driving vehicle. Specifically, the information providing vehicle $V_s$ may accumulate the number of the property information extracted from the grouped regions of interest, and then select property information having the largest number of the accumulation as the property information of the driving vehicle.

In addition, the information providing vehicle $V_s$ may obtain the probability information that the driving vehicle has the selected property information. Specifically, the information providing vehicle $V_s$ may obtain probability information W_property that the driving vehicle has the selected property information according to Equation 4.

$$W\_property=(N\_best)/(N\_total) \quad \text{Equation 4}$$

Herein, N_best may indicate a maximum amount of accumulation of the property information, and N_total may indicate a total amount of accumulation of the property information.

Through this, the information providing vehicle $V_s$ may obtain, as the identification information, the property information having the highest probability and the probability information that the driving vehicle has the corresponding property information.

Finally, in a step S140, the information providing vehicle $V_s$ may transmit the absolute location information and the identification information of the driving vehicle to the vehicle location estimating apparatus 100.

Heretofore, the vehicle location estimating method performed by the information providing vehicle $V_s$ has been described. Hereinafter, a vehicle location estimating method performed by the vehicle location estimating apparatus 100 will be described.

Figure 7:
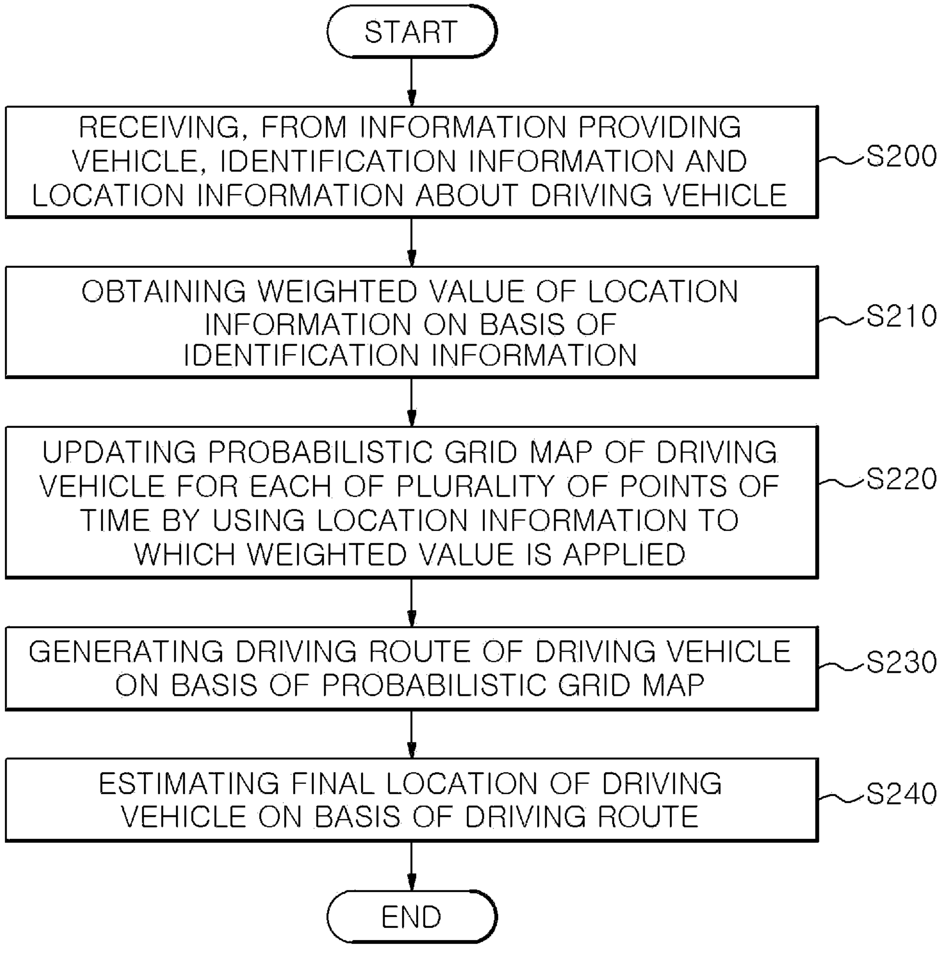
FIG. 7 shows a diagram illustrating a vehicle location estimating method performed by a vehicle location estimating apparatus according to an embodiment of the present disclosure.

FIG. 7 shows a diagram illustrating a vehicle location estimating method performed by the vehicle location estimating apparatus 100 according to an embodiment of the present disclosure.

First, in a step S200, the vehicle location estimating apparatus 100 may receive identification information and absolute location information on a driving vehicle from the information providing vehicle $V_s$ through the communication unit 110. In this case, the vehicle location estimating apparatus 100 may receive a plurality of identification information and absolute location information of a plurality of driving vehicles from a plurality of the information providing vehicles $V_s$.

Thereafter, in a step S210, the vehicle location estimating apparatus 100 may obtain a weighted value of the location information based on the identification information through the weighted value obtaining unit 120. Specifically, the weighted value obtaining unit 120 may first classify, based on first identification information for a license plate among the received identification information, second identification information for other than the license plate into several groups. For example, the weighted value obtaining unit 120 may classify the second identification information in the identification information including the first identification information of '1111' for the license plate.

When the second identification information is grouped, the weighted value obtaining unit 120 may obtain the weighted value of the location information by accumulating the grouped second identification information. According to the above-described example, the second identification information for the size, color, and vehicle type in the identification information including the first identification information of '1111' may be accumulated. In this case, the accumulated second identification information may indicate probability that the driving vehicle has property information for each of the size, color, vehicle type, and the like. For example, if property information for the size of the driving vehicle is 2×2 and probability information is 0.7, the probability information of 0.7 may be accumulated into the probability information in the received identification information including the property information for the size of 2×2.

Thereafter, the weighted value obtaining unit 120 may obtain the weighted value by multiplying the probability information accumulated for each property information. If the property information is for the size, color, and vehicle type of the driving vehicle, the weighted value obtaining unit 120 may obtain a weighted value W_total according to Equation 5.

$$W\_total=(W\_size)\times(W\_color)\times(W\_type) \quad \text{Equation 5}$$

Herein, W_size may indicate accumulated probability information for the property information for the size, W_color may indicate accumulated probability information for the property information for the color, and W_type may indicate accumulated probability information for the property information for the vehicle type.

In this case, before applying Equation 5, the weighted value obtaining unit 120 may normalize the accumulated probability information for each property information so that the sum becomes one.

After obtaining the weighted value, in a step S220, the vehicle location estimating apparatus 100 may generate, through the grid map generating unit 130, a probabilistic grid map of the driving vehicle for each of a plurality of points of time by applying the weighted value to the location information. Herein, the probabilistic grid map may indicate a map in which the probability information that the driving vehicle is located on each of a plurality of grids at a specific point of time is accumulated.

Hereinafter, a method of generating the probabilistic grid map will be described with reference to FIGS. 8 and 9.

Figure 8:
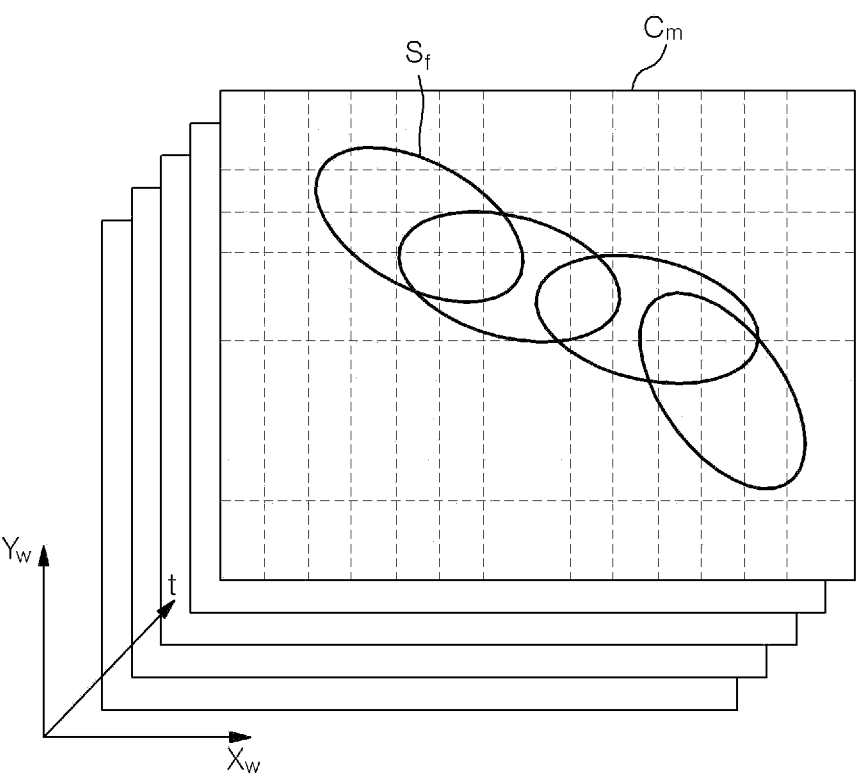
FIG. 8 shows a diagram illustrating a probabilistic grid map generated by a vehicle location estimating apparatus according to an embodiment of the present disclosure.
Figure 9:
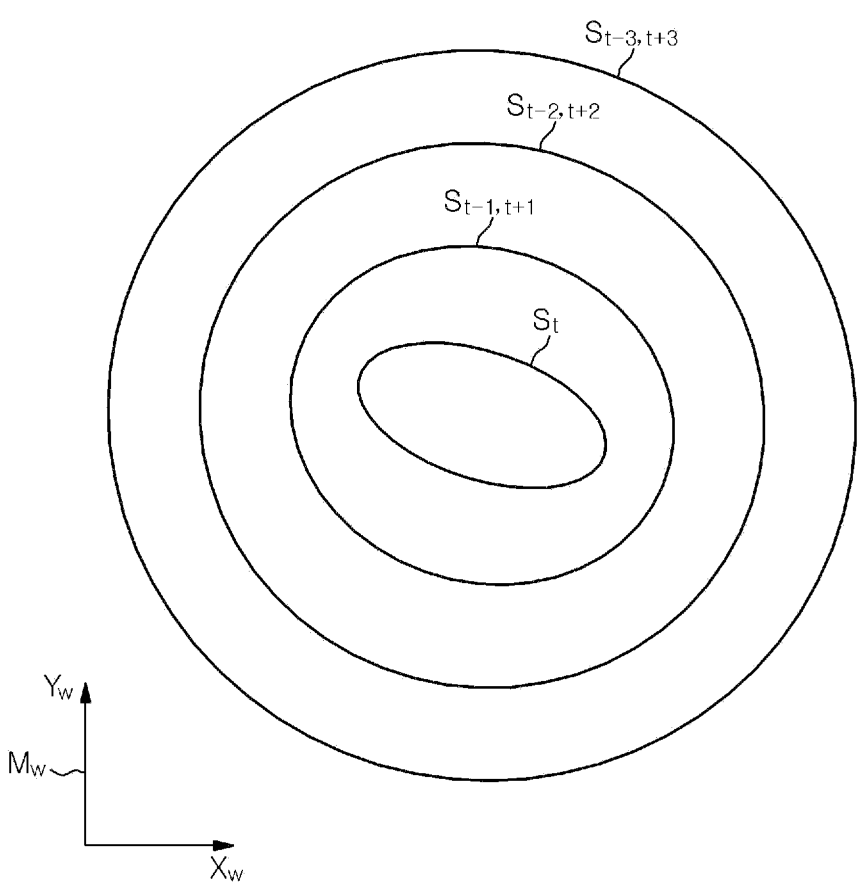
FIG. 9 shows a diagram illustrating a probability distribution for a location at adjacent points of time obtained by a vehicle location estimating apparatus according to an embodiment of the present disclosure.

FIG. 8 shows a diagram illustrating the probabilistic grid map generated by the vehicle location estimating apparatus 100 according to an embodiment of the present disclosure and FIG. 9 shows a diagram illustrating a probability distribution for a location at adjacent points of time obtained by the vehicle location estimating apparatus 100 according to an embodiment of the present disclosure.

First, the grid map generating unit 130 may apply the weighted value to the probability information corresponding to a specific point of time in the received location information. In this case, the received location information may include location coordinates of the driving vehicle obtained by the information providing vehicle $V_s$ and probability information that the driving vehicle is located at estimated location coordinates.

Thereafter, the grid map generating unit 130 may accumulate the probability information to which the weighted value is applied to a grid corresponding to the location coordinates in the received location information. In this case, the grid map generating unit 130 may generate the probabilistic grid map by using location information within a predetermined threshold probability in the Gaussian Distribution according to Equation 3. FIG. 8 illustrates a probabilistic grid map $C_m$ in which a region of covariance $S_f$ is shown if the predetermined threshold probability is 90%.

At this time, since the probabilistic grid map is discontinuous whereas the Gaussian Distribution is continuous, the grid map generating unit 130 may accumulate the probability information to which the weighted value by applying the weighted value to an integral value of Gaussian Distribution Probability Density Function (PDF) corresponding to each grid.

In addition, since the grid map generating unit 130 may generate the probabilistic grid map repeatedly at a plurality of point of time, the probabilistic grid map may have a time axis (t-axis) together with an $X_W$ axis and an $Y_W$ axis based on an absolute coordinate system. In FIG. 8, it may be seen that the probabilistic grid map follows the t-axis together with the $X_W$ axis and $Y_W$ axis.

Further, the grid map generating unit 130 may update the probabilistic grid map at the adjacent point of time based on an estimated traveling distance of the information providing vehicle $V_s$ according to an interval between the adjacent points of time. Herein, the estimated traveling distance may indicate a traveling distance of the information providing vehicle $V_s$ estimated based on traffic conditions of the road on which the information providing vehicle $V_s$ is running and driving speeds of a plurality of vehicles traveling on the road where the information providing vehicle $V_s$ is running. The estimated traveling distance may be input from an external device or may be determined by an internal operation of the vehicle location estimating apparatus 100.

Specifically, the grid map generating unit 130 may obtain location information at a second point of time $t_2$ adjacent to a first point of time $t_1$ by using location information corresponding to the first point of time $t_1$ according to Equation 6.

$$\text{Mean Position: } \begin{bmatrix} x^{t2} \\ y^{t2} \end{bmatrix} = \begin{bmatrix} x^{t1} \\ y^{t1} \end{bmatrix} \qquad \text{Equation 6}$$

$$\text{Covariance: } C_{t2} = C_{t1} + \begin{bmatrix} \sigma^2_{t1,t2} & 0 \\ 0 & \sigma^2_{t1,t2} \end{bmatrix}$$

Herein, $[x^{t1}\ y^{t1}]^T$ may refer to location coordinates at the first point of time $t_1$ and $[x^{t2}\ y^{t2}]^T$ may refer to location coordinates at the second point of time $t_2$, $C_{t1}$ may refer to covariance at the first point of time $t_1$ and $C_{t2}$ may refer to covariance at the second point of time $t_2$, and $\sigma_{t1,t2}$ may indicate a product of the estimated traveling distance D and a Tuning Parameter k.

In FIG. 9, a region of covariance $S_t$ according to location information obtained at a point of time t and regions of covariance at adjacent points of time to the point of time t are illustrated. Specifically, it may be seen that a region of covariance $S_{t-1,t+1}$ at the points of time t−1 and t+1 adjacent to the point of time t have a wider area around the region of covariance $S_t$ at the point of time t. In addition, a region of covariance $S_{t-2,t+2}$ at points of time t−2 and t+2 may be formed to extend outward from the region of covariance St at the point of time t and the region of covariance $S_{t-1,t+1}$ at the points of time t−1 and t+1. Similarly, it may be seen that a region of covariance $S_{t-3,t+3}$ at points of time t−3 and t+3 is formed to extend outward from the region of covariance St at the point of time t, the region of covariance $S_{t-1,t+1}$ at the points of time t−1 and t+1, and the region of covariance $S_{t-2,t+2}$ at the points of time t−2 and t+2.

As described above, when estimating the location information at an adjacent point of time by using the location information at a specific point of time, it may be identified that the region of covariance becomes an enlarged form.

Referring back to FIG. 7, in a step S230, the vehicle location estimating apparatus 100 may generate a driving route of the driving vehicle based on the probabilistic grid map through the location estimating unit 140. The location estimating unit 140 according to an embodiment may generate the driving route of the driving vehicle by connecting a grid having the highest probability that the driving vehicle is located on the grid on the probabilistic grid map at each point of time.

However, since there is a possibility that there is an error in a probability accumulated in the grid, the location estimating unit 140 may use a method such as Dynamic Programming. The location estimating unit 140 according to another embodiment may first search for a candidate driving route of the driving vehicle based on the probabilistic grid map. Herein, the candidate driving route may indicate a route including one of grids having a threshold probability or higher on each of the plurality of the probabilistic grid maps, and the threshold probability may indicate the lowest probability that the driving vehicle may be located. The location estimating unit 140 according to an embodiment may search for possible candidate driving routes, or alternatively, may randomly search for arbitrary number of possible candidate driving routes.

Thereafter, the location estimating unit 140 may determine one of the searched candidate driving routes as the driving route based on a change in a location of the driving vehicle at adjacent points of time on the candidate driving routes and a sum of the probability that the driving vehicle is located at each point of time. Specifically, the location estimating unit 140 may determine, as the driving route, a candidate driving route in which the sum of probabilities accumulated on each grid included in the candidate driving route is the maximum while minimizing an amount of change in the location of the driving vehicle at adjacent points of time on the candidate driving route.

Finally, in a step S240, the vehicle location estimating apparatus 100 may estimate a location of the driving vehicle based on the driving route through the location estimating unit 140. Specifically, the location estimating unit 140 may estimate a location on the driving route at the last point of time as the final location of the driving vehicle.

Referring back to FIG. 1, when receiving a request from an external device or a user, the vehicle location estimating apparatus 100 may generate and provide a Heat Map corresponding to the probabilistic grid map. Herein, the heat map may refer to a map in which an integral value of the probability for each grid during a predetermined time period is expressed in a corresponding color. In this case, the vehicle location estimating apparatus 100 may apply a low weighted value to a probability at a point of time far from a current point of time in the predetermined time period and apply a high weighted value to a probability at a point of time close to the current point of time in the predetermined time period to integrate.

When a request for providing the heat map for a specific time period is input from the external device or the user, the vehicle location estimating apparatus 100 may obtain an integral value of a probability for each grid in the time period and display a color corresponding thereto on each grid. For example, the vehicle location estimating apparatus 100 may provide a heat map in which a grid with a high probability is displayed in red and a grid with a low probability is displayed in blue. Through this, the user may visually and intuitively determine the location of the driving vehicle in the time period.

The vehicle location estimating apparatus 100 and the vehicle location estimating method described above may increase accuracy of location estimation for the driving vehicle because the information providing vehicle $V_s$ obtains probability information for property information by accumulating the property information of the driving vehicle and the vehicle location estimating apparatus 100 applies the weighted value determined based on the probability information for the property information to the location information of the driving vehicle.

Specifically, if the property information for a license plate is estimated from a surrounding image obtained by a camera having a low resolution, accuracy of identifying the driving vehicle may be lowered. On the other hand, the vehicle location estimating apparatus 100 and the vehicle location estimating method according to an embodiment of the present disclosure probabilistically considers the property information for properties other than the license plate, thereby reducing a possibility of misrecognition according to the low resolution.

On the other hand, each of the steps included in the vehicle location estimating method according to an embodiment described above may be implemented in the computer program programmed to execute each of the steps and a computer-readable storage medium including the computer program.

According to one embodiment, the vehicle location estimating apparatus 100 and the vehicle location estimating method described above may be used in various fields such as a home, an industrial site, or the like, thereby having industrial applicability.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. An apparatus for estimating a location of a vehicle, the apparatus comprising:

one or more processors; and memory storing instructions thereon, the instructions when executed by the one or more processors cause the one or more processors to:

receive, from an information providing vehicle, identification information and location information on a driving vehicle in a vicinity of the information providing vehicle, the identification information comprising license plate information of the driving vehicle and at least one of a size, a vehicle type or a color of the driving vehicle;

obtain a weighted value representing accuracy of the location information of the driving vehicle based on the received identification information;

classify the at least one of the size, the vehicle type or the color of the driving vehicle into groups, each of the groups associated with one of license plates;

obtain the weighted value by accumulating the at least one of the size, the vehicle type or the color for each of the groups;

generate, in real time, a probabilistic grid map of the driving vehicle at each of a plurality of points of time by applying the weighted value to the location information, wherein probability information that the driving vehicle is located on each of a plurality of grids at a first point of time is accumulated on the probabilistic grid map; and estimate a location of the driving vehicle by applying the weighted value to the location information based on the probabilistic grid map;

wherein the identification information and location information are obtained based on surrounding images captured by a camera sensor mounted on the information providing vehicle, and wherein the surrounding images are processed to detect the driving vehicle and extract the license plate information and at least one of the size, the vehicle type or the color of the driving vehicle.

2. The apparatus of claim 1, wherein the identification information further comprises first probability information indicating a probability that the driving vehicle has the license plate information, and third probability information indicating a probability that the driving vehicle has the at least one of the size, the vehicle type or the color, and wherein the instructions cause the one or more processors to obtain the weighted value by multiplying the third probability information accumulated for each of the size, the vehicle type or the color.

3. The apparatus of claim 1, wherein, the location information includes location coordinates of the driving vehicle obtained by the information providing vehicle and third probability information indicating a probability that the driving vehicle is located at the obtained location coordinates, and wherein the instructions cause the one or more processors to apply the weighted value to the third probability information in the received location information corresponding to the first point of time, and accumulate the third probability information to which the weighted value is applied on a grid corresponding to the location coordinates in the received location information.

4. The apparatus of claim 1, wherein the instructions cause the one or more processors to update, based on an estimated traveling distance of the information providing vehicle according to an interval between the first point of time and a second point of time adjacent to the first point of time, the probabilistic grid map for the second point of time.

5. The apparatus of claim 1, wherein the instructions cause the one or more processors to determine a vehicle route of the driving vehicle by using the probabilistic grid map, and estimate the location of the driving vehicle based on the determined vehicle route.

6. The apparatus of claim 5, wherein the instructions cause the one or more processors to search for candidate vehicle routes of the driving vehicle based on the probabilistic grid map, determine one of the searched candidate vehicle routes as the vehicle route based on a change in a location of the driving vehicle at adjacent points of time and a sum of probabilities that the driving vehicle is located at each point of time on the candidate vehicle route, and estimate a location on the vehicle route at a last point of time as the location of the driving vehicle.

7. A method of estimating a location of a vehicle, the method comprising:

receiving, from an information providing vehicle, identification information and location information on a driving vehicle in a vicinity of the information providing vehicle, the identification information comprising license plate information of the driving vehicle and at least one of a size, a vehicle type or a color of the driving vehicle;

obtaining a weighted value representing accuracy of the location information of the driving vehicle based on the received identification information;

classifying the at least one of the size, the vehicle type or the color of the driving vehicle into groups, each of the groups associated with one of license plates;

obtaining the weighted value by accumulating the at least one of the size, the vehicle type or the color for each of the groups;

generating, in real time, a probabilistic grid map of the driving vehicle at each of a plurality of points of time by applying the weighted value to the location information, wherein probability information that the driving vehicle is located on each of a plurality of grids at a first point of time is accumulated on the probabilistic grid map; and estimating a location of the driving vehicle by applying the weighted value to the location information based on the probabilistic grid map;

wherein the identification information and location information are obtained based on surrounding images captured by a camera sensor mounted on the information providing vehicle, and wherein the surrounding images are processed to detect the driving vehicle and extract the license plate information and at least one of the size, the vehicle type or the color of the driving vehicle.

8. The method of claim 7, wherein the identification information further comprises first probability information indicating a probability that the driving vehicle has the license plate information, and third probability information indicating a probability that the driving vehicle has the at least one of the size, the vehicle type or the color, and wherein the obtaining the weighted value includes:

obtaining the weighted value by multiplying the third probability information accumulated for each of the size, the vehicle type or the color.

9. The method of claim 8, wherein the location information includes location coordinates of the driving vehicle obtained by the information providing vehicle and third probability information indicating a probability that the driving vehicle is located at the obtained location coordinates, and wherein the generating the probabilistic grid map of the driving vehicle includes:

applying the weighted value to the third probability information in the received location information corresponding to the first point of time; and accumulating the third probability information to which the weighted value is applied on a grid corresponding to the location coordinates in the received location information.

10. The method of claim 7, wherein generating the probabilistic grid map of the driving vehicle includes:

updating, based on an estimated traveling distance of the information providing vehicle according to an interval between the first point of time and a second point of time adjacent to the first point of time, the probabilistic grid map for the second point of time.

11. The method of claim 7, wherein the estimating the location of the driving vehicle includes:

determining a vehicle route of the driving vehicle by using the probabilistic grid map; and estimating a last location of the driving vehicle based on the determined vehicle route.

12. The method of claim 11, wherein the estimating the location of the driving vehicle includes:

searching for candidate vehicle routes of the driving vehicle based on the probabilistic grid map;

determining one of the searched candidate vehicle routes as the vehicle route based on a change in a location of the driving vehicle at adjacent points of time and a sum of probabilities that the driving vehicle is located at each point of time on the candidate vehicle route; and estimating a location on the vehicle route at a last point of time as the last location of the driving vehicle.

13. A non-transitory computer-readable storage medium including computer executable instructions, wherein the instructions, when executed by a processor, cause the processor to perform a transfer method, the method comprising:

receiving, from an information providing vehicle, identification information and location information on a driving vehicle in a vicinity of the information providing vehicle, the identification information comprising license plate information of the driving vehicle and at least one of a size, a vehicle type or a color of the driving vehicle;

obtaining a weighted value representing accuracy of the location information of the driving vehicle based on the received identification information;

classifying the at least one of the size, the vehicle type or the color of the driving vehicle into groups, each of the groups associated with one of license plates;

obtaining the weighted value by accumulating the at least one of the size, the vehicle type or the color for each of the groups;

generating, in real time, a probabilistic grid map of the driving vehicle at each of a plurality of points of time by applying the weighted value to the location information, wherein probability information that the driving vehicle is located on each of a plurality of grids at a first point of time is accumulated on the probabilistic grid map, wherein the location information includes location coordinates of the driving vehicle obtained by the information providing vehicle and second probability information indicating a probability that the driving vehicle is located at the obtained location coordinates;

estimating a location of the driving vehicle by applying the weighted value to the location information based on the probabilistic grid map;

wherein the identification information and location information are obtained based on surrounding images captured by a camera sensor mounted on the information providing vehicle, and wherein the surrounding images are processed to detect the driving vehicle and extract the license plate information and at least one of the size, the vehicle type or the color of the driving vehicle.

* * * * *